April 10, 1962    M. J. SCHONFIELD    3,028,677
AIR GAUGE HEAD
Filed Jan. 16, 1958
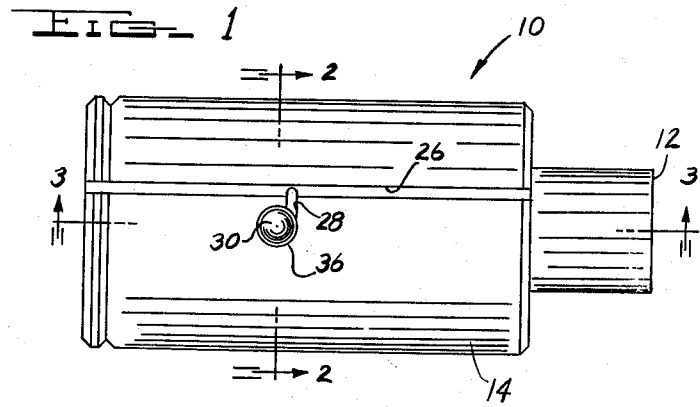
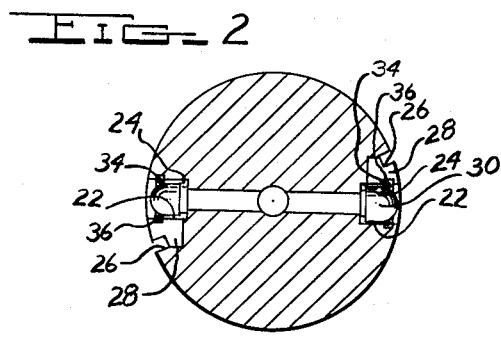
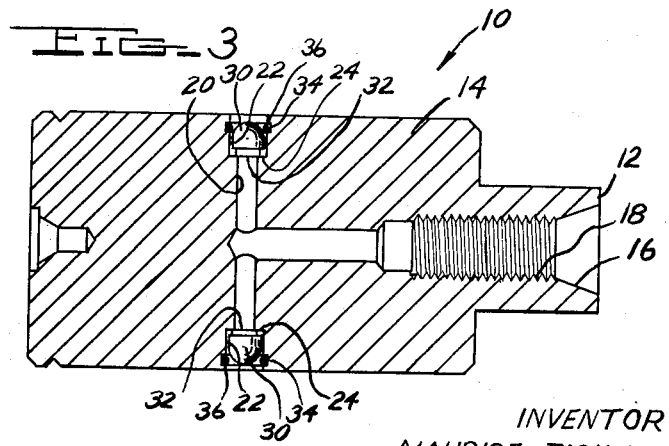
INVENTOR
MAURICE JACK SCHONFIELD
Finn G. Olsen
ATTORNEY United States Patent Office 3,028,677
Patented Apr. 10, 1962

3,028,677
AIR GAUGE HEAD
Maurice Jack Schonfield, Dearborn, Mich., assignor to Dearborn Gage Company, Dearborn, Mich., a corporation of Michigan
Filed Jan. 16, 1958, Ser. No. 709,281
4 Claims. (Cl. 33—178)

The present invention relates to air gauge heads for use with air gauges and the like which are responsive to changes in the flow of air or other fluids under pressure.

Various types of air gauge heads of this general character have been developed for measuring internal dimensions of bored holes, and the like. Some of these employ spring actuated contact elements and others may use as the contact elements freely rotatable balls retained in pockets. In all of these constructions the position of the contact elements, as governed by the size of the measured part, is used to control flow of air from an orifice, and suitable air gauges or instruments determine from the flow of air if the measured part has proper dimensions.

Each of these prior art devices has certain advantages as well as disadvantages in connection with their manufacture or use. Thus, gauge heads employing spring actuated elements generally have a greater number of small parts increasing manufacturing as well as maintenance costs. Also, these gauge heads may wear more rapidly. In this respect, the ball contact elements are superior, because the rolling action of the balls reduces the wearing action between the balls and the workpiece being measured.

However, this advantage of the ball type contact elements may in some instances result in inferior results because the same surface of the ball may on some occasions be positioned opposite the air orifice for controlling the flow of air and on other occasions to contact the surface of the workpiece. Thus, if the ball should be worn out of round, the air gauge cannot be adjusted to compensate for the wear because the worn spot does not remain in the same position with respect to the orifice.

It is an object of the present invention to overcome the defects of the prior art devices and to provide an air gauge head which has more uniform operating characteristics while retaining all the advantages of a relatively low cost, simple and efficient unit.

It is another object of the present invention to provide an air gauge head of the foregoing character which is constructed and arranged so that the contact element can revolve only about an axis perpendicular to the surface of the workpiece being measured, thereby obtaining optimum wearing qualities from the contact element while maintaining uniformly constant, accurate measuring results from the gauge head.

It is still another object of the present invention to provide an air gauge head of the foregoing character which is constructed and arranged so that the contact elements can be readily replaced when desired.

Other objects of this invention will appear in the following description and appended claims, reference being had to the accompanying drawings forming a part of this specification wherein like reference characters designate corresponding parts in the several views.

In the drawings:

FIGURE 1 is a side elevation of a gauge head embodying the present invention;

FIGURE 2 is a section taken on the line 2—2 of FIGURE 1; and

FIGURE 3 is a longitudinal section taken on the line 3—3 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, a more detailed description of the invention will be given. The air gauge head 10 has an inlet end 12 which is adapted to be connected to a conduit or other suitable fitting which communicates with an air gauge (not shown). The cylindrical body 14 has an air supply passageway 16 which is internally threaded at 18 for attachment to the conduit or fitting. The supply passageway 16 discharges into the diametral passageway 20 which terminates at opposite ends in the pockets 22, which are enlarged bores of the passageway 20 and form outwardly facing annular shoulders 24. The body 14 has longitudinally extending channels 26 with laterally extending channels 28 communicating with said pockets 22 so that air flowing from diametral passageway 20 can flow into pockets 22 and escape through channels 26 via channels 28.

The flow of air from diametral passageway 20 into and through pockets 22 is controlled by work-contacting elements 30. The latter are generally cylindrical in shape, and each having an inner end shaped like a pin 32 with a flat base for seating on the annular shoulder 24 as will subsequently be described, the spacing of the base from the annular shoulder 24 will be the determining factor in measuring the rate of air flow, and this feature of having a pin which is smaller in diameter than the main body of the element 30 permits a more sensitive measurement than would be the case if other portions of the contact element 30 were to be in the path of air flow immediately adjacent the measuring surfaces of the annular shoulder 24 and base of pin 32. The opposite end, or the outer end of each work-contacting element 30 is hemispherical in shape, and its outer tip is below the outer surface of the cylindrical body 14 when element 30 is seated on shoulder 24, but when raised therefrom by air flowing through diametral passageway 20 the tip will project a small distance beyond the surface of cylindrical body 14. The extent of outward movement of work-contacting elements 30 must be limited in the absence of a workpiece by suitable means, and in the present invention this is accomplished by grooves 34 formed in the side walls of pockets 22 and removable C-shaped retainer rings 36 which have been snapped into such grooves. Thus, the rings 36 will retain the work-contacting elements 30 in pockets 22, and to remove such elements 30 it is only necessary to remove the C-shaped rings 34.

The illustrated embodiment of the invention is designed for use in checking the internal diameter of a hole in a workpiece. In operation, the gauging head 10 will be inserted in the hole and air under pressure is caused to flow through the air gauge (not shown) to the supply passageway 16. The passage of air through passageways 16 and 20 will raise work-contacting elements 30 from their seats into contact with the inner walls of the hole in the workpiece. The amount of air that can flow with the pressure of air to the air gauge remaining constant is a direct function of the distance the work contacting elements 30 are raised from their seats on shoulders 24. Since the limit of this raising action is controlled by the internal diameter of the aforesaid hole, said diameter determines the amount of air that can flow. The air gauge can be one of several well known types which are responsive to the air flowing to the gauging head 10 for indicating whether or not the diameter of the hole in the workpiece is acceptable.

One of the features of the present invention is the arrangement whereby each annular shoulder 24 and the associated flat base of element 30 always remain opposite one another even through each work-contacting element 30 may rotate around its longitudinal axis. In this manner, the wear of element 30 will not impair the associated seating surfaces between elements 30 and pockets 22. While the outer surfaces of elements 30 may become worn after extended use, the fact that elements 30 can rotate around their axes will cause this wear to be evenly distributed on the outermost end. The air gauge can be recalibrated at such times and the gauging head 10 can be continued in use. This is particularly true because no wear or damage will have occurred to the aforesaid seating surfaces which control the amount of air that can flow. In this connection, it is to be understood that the space between each annular shoulder 24 and the base of each work-contacting element 30 is the smallest effective cross-sectional area through which the supply air passes, thereby being the determining factor in the transmission of signals to the air gauge. Thus, the cylindrical side walls of the contacting elements 30 are spaced from the side walls of their respective pockets 22 a sufficient distance so that the cross-sectional areas of the air passages around the side walls of the contacting elements 30 will always be greater than the maximum permitted effective areas between the annular shoulders 24 and the bases of the contacting elements 30.

From the foregoing it will be apparent that a very simple gauge head is provided which has a minimum of parts and which will require very little maintenance or repair. It can be assembled very easily and by virtue of its simplicity can be manufactured at a relatively low cost.

Having thus described my invention, I claim:

1. A gauging head for use with an air gauge comprising a generally cylindrical body having an air supply passageway therein and a diametral passageway in communication with said air supply passageway, said body having pockets at the outlet ends of the diametral passageway, said pockets each having an outwardly facing annular shoulder and a circumferential groove located outwardly of the shoulder, a cylindrical-shaped work-contacting element carried in each pocket for limited free axial movement and for free rotation about the cylinder axis, each of said elements normally being spaced from the side wall of its pocket to provide an air passage and having a generally spherical-shaped outer surface and a coaxially aligned pin projecting inwardly and terminating in a flat inner surface, the flat inner surface seating on said annular shoulder when the work-contacting element is in its innermost position, a removable retaining ring in said circumferential groove for limiting the outward movement of said work-contacting element, the relationship of the retaining ring, the cylindrical body and the work-contacting element being such that when the latter is raised off its seat by the flow of air through said diametral passageway the outer portion of said work-contacting element will project slightly beyond the surface of the cylindrical body.

2. A gauging head for use with an air gauge comprising a generally cylindrical body having an air supply passageway therein and a diametral passageway in communication with said air supply passageway, said body having pockets at the outlet ends of the diametral passageway, said pockets each having an outwardly facing annular shoulder and a circumferential groove located outwardly of the shoulder, a cylindrical-shaped work-contacting element carried in each pocket for limited free axial movement and for free rotational movement about its axis, each of said elements normally being spaced from the side wall of its pocket so as to provide an air passage therebetween and having a generally spherical-shaped outer surface and a coaxially aligned pin projecting inwardly and terminating in a flat inner surface, the flat inner surface seating on said annular shoulder when the work-contacting element is in its innermost position, a removable retaining ring in said circumferential groove for limiting the outward movement of said work-contacting element, the relationship of the retaining ring, the cylindrical body and the work-contacting element being such that when the latter is raised off its seat by the flow of air through said diametral passageway the outer portion of said work-contacting element will project slightly beyond the surface of the cylindrical body, and said generally cylindrical body having air escape channels in its outer surface communicating laterally with each of said pockets, the effective cross section for flow of air between said flat inner surface of said work-contacting element and said annular shoulder being less than that elsewhere in the air flow circuits of said gauging head so that flow of air will be a direct function of the axial positions of said work-contacting elements.

3. A gauging head for use with an air gauge comprising a generally cylindrical body having an air supply passageway therein and a diametral passageway in communication with said air supply passageway, said body having pockets at the outlet ends of the diametral passageway, said pockets each having an outwardly facing annular shoulder, a cylindrical-shaped work-contacting element carried in each pocket for limited free axial movement and for free rotation about the axis of said element, each of said elements normally being spaced from the side wall of its pocket to provide an air passage and having a generally spherical-shaped outer surface and a coaxially aligned pin projecting inwardly and terminating in a flat inner surface, the flat inner surface seating on said annular shoulder when the work-contacting element is in its innermost position, means in each of said pockets for limiting the outward movement of said work-contacting element, the relationship of said means, the cylindrical body and the work-contacting element being such that when the latter is raised off its seat by the flow of air through said diametral passageway the outer portion of said work-contacting element will project slightly beyond the surface of the cylindrical body.

4. A gauging head for use with an air gauge comprising a body having an air supply passageway therein with a pocket at the outlet end of said passageway, said pocket having an outwardly facing flat annular shoulder, a cylindrical-shaped work-contacting element carried in said pocket for limited axial movement and for free rotation about the axis of said element, said element normally being spaced from the side wall of said pocket to provide an air passage and having a generally spherical-shaped outer surface and a coaxially aligned pin projecting inwardly and terminating in a flat inner surface, the flat inner surface seating on said annular shoulder when the work-contacting element is in its innermost position, and retainer means for limiting the outward movement of said work-contacting element after the outer surface of the latter projects a small distance beyond the surface of said body.

References Cited in the file of this patent

UNITED STATES PATENTS

| | | |
|---|---|---|
| 954,338 | Pearson | Apr. 5, 1910 |
| 2,501,965 | Rupley | Mar. 28, 1950 |
| 2,693,037 | Fox | Nov. 2, 1954 |
| 2,706,339 | Aller | Apr. 19, 1955 |
| 2,807,880 | Darmody | Oct. 1, 1957 |